June 13, 1967 L. F. KOOISTRA 3,325,140
ELECTROMAGNETICALLY RESPONSIVE DAMPER
SEALING AND OPENING DEVICE
Filed Aug. 20, 1964

INVENTOR.
Lambert F. Kooistra
BY
*J. P. Moran*
ATTORNEY

United States Patent Office 3,325,140
Patented June 13, 1967

3,325,140
ELECTROMAGNETICALLY RESPONSIVE DAMPER SEALING AND OPENING DEVICE
Lambert F. Kooistra, Akron, Ohio, assignor to The Babcock & Wilcox Company, New York, N.Y., a corporation of New Jersey
Filed Aug. 20, 1964, Ser. No. 390,983
7 Claims. (Cl. 251—161)

This invention relates generally to dampers and the like for opening and closing a passageway, and especially to a damper assembly having magnetic means for improving the operational effectiveness thereof.

Industrial plants often employ ducts for conducting various kinds of fluids, with a damper assembly being used to control flow through the ducts. It is frequently desirable to close the damper to prevent flow through the duct for such purposes as to isolate equipment during repair. In operation, however, the damper may not make a tight seal against its frame, with the result that the damper is of limited effectiveness. On the other hand, the damper may stick or bind in closed position, thereby presenting special problems when it is desired to open the damper and resume flow through the duct. It is, therefore, a principal concern of the present invention to provide means for more effectively sealing the damper in closed position, and also to apply a large opening force to overcome sticking or binding of the damper in closed position.

Unlike prior art electromagnetic devices employed only to position the damper blade, the device of the present invention tightly seals the damper after the damper has been moved to closed position by a closing mechanism; and, also, the electromagnetic device of the present invention can exert a supplementary opening force when the damper is to be opened by an opening mechanism.

The dependability and effectiveness of flow dampers are improved by overcoming the aforesaid difficulties of binding and ineffective sealing, according to the present invention, by providing an elongated electromagnet arranged along the edges of the movable damper blade in position to seal the blade against the stationary damper frame by magnetic attraction.

In one form of the present invention, opposite magnetic poles of the electromagnetic device extend longitudinally in side-by-side relationship, and they are positioned on the edges of a movable damper member to be operatively associated with unlike poles of another magnet on the edges of the stationary damper member. The present invention also contemplates applying an opening force to the damper assembly by reversing the direction of current flow through one electromagnet, thereby reversing the polarity of the poles on that one electromagnet, so that magnetic poles on the one damper member are repelled by associated poles of like polarity on the other damper member.

The various objects, features and advantages of the invention will appear more fully from the detailed description which follows, taken in connection with the accompanying drawing, forming a part of the present invention and in which.

Figure 2:
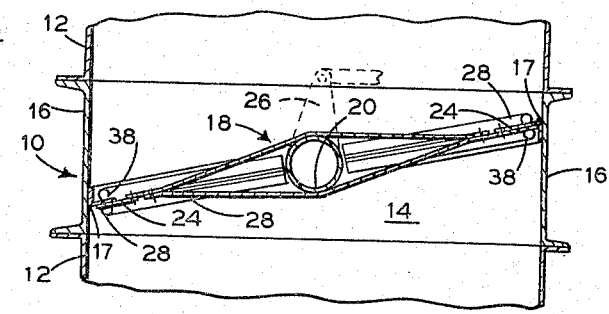
FIG. 2 is an enlarged transverse sectional view of the damper assembly, taken along line 2—2 of FIG. 1.
Figure 3:
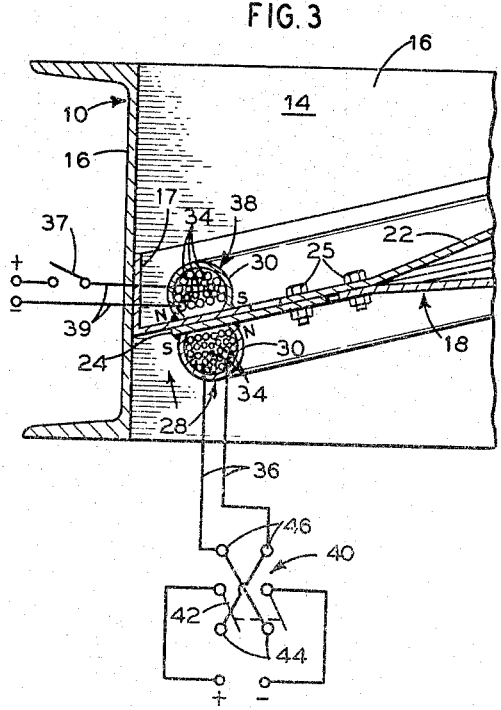
Figure 4:
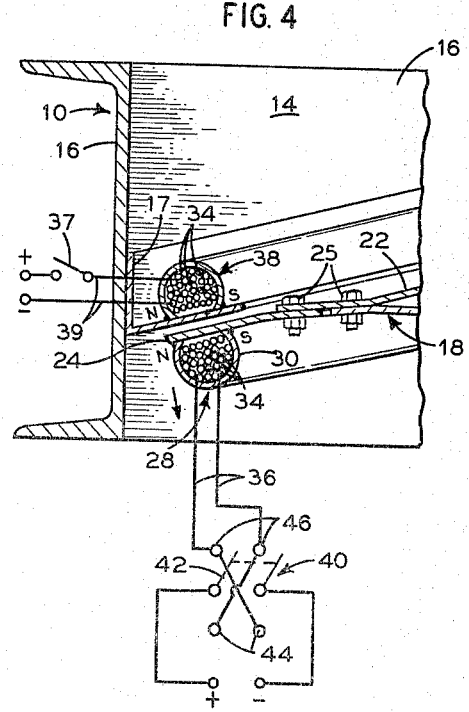

FIG. 3 is an enlarged view of a fragment of the apparatus of FIG. 2, with magnetic poles being employed to effect a closing force, and with associated electric control circuitry for the electromagnets of the damper assembly being shown diagrammatically; and FIG. 4 is a view similar to FIG. 3, but showing reversed magnetic poles of the electromagnet on the damper blade as they are employed to effect an opening force on the assembly.

The invention, as best seen in FIG. 2, is directed to a damper assembly 10 applied to a duct 12 providing a passageway for fluids. It is the function of the damper assembly to control the flow of fluid through the duct 12.

The damper assembly 10 comprises a damper frame 14 defining an opening and which may be made up of structural steel channels 16. Each channel 16 serves as a leg of the four-sided rectangular frame 14 and it supports a bracket 17 providing a seating surface disposed generally transverse to the direction of fluid flow through the duct 12. Mounted in the opening of the frame 14 is a butterfly or damper blade 18 supported on a damper shaft 20, the latter being pivotally connected to opposite channels 16 of the frame 14 so that the blade 18 is movable between open and closed positions relative to the frame 14. It is also preferred that the damper shaft 20 be hollow so that it may also serve as a conduit for electrical conductors. Flow through the duct 12 is controlled by the extent to which the damper blade 18 is open; and in closed position of the damper blade 18 there can be no flow through the duct 12.

The damper blade 18 comprises a main or body portion 22 and also a flexible edge portion 24, which is preferably made from a thin sheet of stainless steel or other durable, low magnetic material. The edge portion 24 is suitably secured, as by bolts 15, to the body portion 22 and arranged to extend beyond all four edges of the body portion 22 in position to seat against the brackets 17 of the frame 14 in sealing relationship. Hot fluid flow through the duct 12 may subject the assembly to temperatures as high as 750° F. and frequently produces undesired dimensional changes in the duct 12 and/or the damper assembly 10, with the result that a tight seal is not always obtainable between the flexible edge portion 24 of the blade 18 and the brackets 17 of the frame 14 when a closing force is applied to the damper blade 18 through the damper shaft 20. For the purposes of this disclosure, the positioning force will be applied manually to shaft 20 through a lever 26, but the invention is not so limited as it is well known that various devices can be employed for this purpose.

Figure 1:
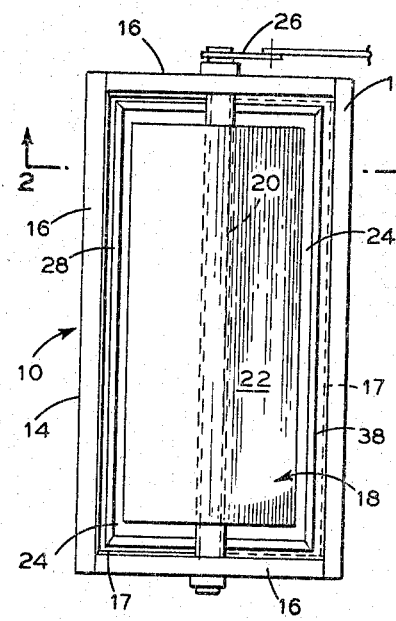
FIG. 1 is an elevational view of the preferred damper assembly of the present invention in closed position.

According to the invention, an elongated electromagnet 28 is secured to the flexible edge portion 24 in order to effect a tight seal between the damper blade 18 and the brackets 17 of the frame 14. As best seen in FIG. 1, one-half of the electromagnet 28 extends along the damper edge in a generally U-shaped line: from adjacent the damper shaft 20 (leftward, as shown) toward the extreme edge of the flexible edge portion 24, next (upward, as shown) along the extreme edge portion, and then (rightward, as shown) back to the vicinity of the damper shaft 20, all on one edge surface of the damper blade 18. The other half of electromagnet 28 extends in like manner along the remaining edge portion 24, but on the opposite surface of the damper blade 18 (see FIG. 2). The electromagnet 28 is positioned on the surface of the damper blade 18 opposite to the surface of the flexible edge portion 24 which contacts the brackets 17 of the damper frame 14; and, hence, the magnetic field from the electromagnet 28 extends through the flexible edge portion 24 of the damper blade 18 toward the brackets 17 in order to draw these parts together into tight engagement. Also, the flexibility of the edge portion 24 adjusts to surface irregularities in the damper frame 14 and the damper body portion 22, whether the same is a result of dimensional changes or as a result of manufacturing discrepancies.

The electromagnet 28 will now be described in further detail with reference to FIGS. 3 and 4. It comprises an elongated split tube or channel member 30 of magnetic material such as soft steel, thus having a generally U-shaped cross-section, the edges of which are secured, as by tack welding, to the surface of the flexible edge portion 24 facing away from the associated brackets 17. This arrangement defines an elongated cavity within the member 30 in which is carried a multiplicity of insulated, current-conducting wires 34 capable of enduring 750° F. Fiberglass is a suitable insulation for the wires 34. These wires 34 extend throughout the length of the electromagnet 28, and they are connected by leads 36 to a source of D.C. electric power. Preferably, the leads 36 extend through the hollow damper shaft 20; and a two-pole, double-throw switch 40 is further provided to control the energization and polarization of the electromagnets.

The arrangement, as thus far described, is capable of effecting a tight seal between the damper blade 18 and the damper frame 14 upon energization of the electromagnet 28, because of the magnetic attraction of the electromagnet 28 for the magnetically responsive brackets 17.

In order to increase the power of magnetic attraction of the damper assembly 10, an additional magnet 38, operated independently of the electromagnet 28, is mounted on the brackets 17. The magnet 38 is preferably an electromagnet which is structurally similar to the electromagnet 28 and, hence, like reference numerals are employed to designate corresponding similar parts. Magnet 38 includes a member 30 mounted on the surface of the damper frame 14 which does not engage the damper blade 18. Stated another way, the electromagnet 38 is mounted on the surface of the brackets 17 opposite the surface which provides a seat for the flexible edge portion 24 of the damper blade 18. Electromagnet 38 also has a cavity extending lengthwise thereof in which wires 34 are carried. Electromagnet 38 is energized when switch 37 is closed to contact the wires 34 to the D.C. source through leads 39. As in the case of the electromagnet 28, each elongated edge of the magnet 38 serves as a magnetic pole; and the poles of the electromagnets 28 and 38 are positionally and operationally arranged so that, during normal energization thereof, respective associated poles of the electromagnets 28 and 38 will be of unlike or opposite polarity as designated by the letters N and S in FIG. 3 in order that they will be magnetically attracted to one another. The magnetic poles extend lengthwise of the elongated member 30, in side-by-side relationship. Thus, strong magnetic forces are employed to bring the flexible edge portion 24 of the damper blade 18 into tight engagement with the brackets 17 of the damper frame 14; and, as mentioned previously, the flexible construction of the damper edge portion 24 ensures that it will form a tight seal with its seat.

It is a further feature of the present invention that opening of the damper assembly 10 may be assisted by magnetic forces. This is accomplished by providing electrical circuitry whereby the direction of current flow through the electromagnet 28 is reversible in order to effect a reversal of polarity at the magnetic poles, designated in FIG. 4 of the drawing by the letters N and S. Electrical current from the D.C. source will flow unidirectionally through the wires 34 of electromagnets 28 and 38 with switch 39 closed and when switch 40 is closed in one position. In the other closed position of two-pole, double-throw switch 40, however, D.C. current will flow through the wires of electromagnet 28 in the same direction, but through the wires of electromagnet 38 in opposite direction. In other words, when a blade 42 of switch 40 engages contacts 44, current will flow as first described in order to effect a tight seal, but when contacts 46 are engaged by the switch blade 42, the direction of current flow will be reversed through electromagnet 38 and respective associated poles of the electromagnets 28 and 38 will be of the same, or like, polarity, with the result that they will repel each other and force the damper blade 18 from a tightly closed position to an open position.

A source of D.C. electrical power is readily available in most industrial plants, and especially electrical power plants; but, if not, a motor-generator set may be employed for such purpose.

It should be understood that the invention can be practiced by transposing the electromagnet 28 and the electromagnet 38 so that an electromagnet of reversible polarity will be mounted on the brackets 17 of the stationary damper frame 14 and an electromagnet of fixed polarity mounted on the movable damper blade 18, with the same results.

Furthermore, it will be obvious to those skilled in the art that although the invention has been shown in but one form, it is susceptible to various changes and modifications without departing from the spirit thereof as set forth in the following claims.

What is claimed is:
1. The combination of:
   a frame member defining a passageway,
   a blade member mounted on said frame member,
   means for moving said blade member between first and second positions to open and close said passageway respectively,
   electromagnetic means for each of said members adapted to create when energized a magnetic field to draw said frame member and said blade member toward one another by magnetic attraction when said blade member is in second position to thereby tightly seal said blade member and said frame member, and
   means operatively associated with said electromagnetic means for reversing the magnetic polarity of one of said electromagnetic means to create when energized mutually repelling magnetic fields between said blade member and said frame member tending to move said blade member from said second position to said first position.

2. The combination with a passageway of a damper assembly for controlling flow through said pasageway, said damper assembly including:
   a frame member defining an opening forming a part of said passageway,
   a blade member mounted in said opening for pivotal movement between open and closed positions,
   electromagnetic means for each of said members adapted to create when energized magnetic fields which draw said frame member and said blade member toward one another by magnetic attraction, and
   means operatively associated with said electromagnetic means selectively operable for creating when energized mutually repelling magnetic fields between said frame member and said blade member tending to move said blade member from closed position to open position.

3. The combination according to claim 2 wherein each of said electromagnetic means is an elongated member having a pair of poles of unlike magnetic polarity extending lengthwise thereof in side-by-side relationship.

4. The combination of:
   a passageway,
   a damper frame member extending about said passageway,
   a damper blade member operatively associated with said frame and adapted to close said passageway,
   means for moving said blade between open and closed positions relative to said passageway,
   first elongated electromagnetic means carried on one of said members and second elongated electromagnetic means carried on the other of said members,
   each of said electromagnetic means being energizable by electrical current to create a magnetic field with magnetic poles of unlike polarity extending in side-by-side relationship longitudinally of each electromagnetic means,
   the respective magnetic poles of opposite polarity of said first and second electromagnetic means being positionally and operatively associated in one direction of current flow through said second electromagnetic means, and means for reversing the direction of current flow through said second electromagnetic means in order to reverse the polarity of its magnetic poles and thereby place respective like poles of said first and second electromagnetic means in positional and operative association;

the construction and arrangement being such that said members are magnetically attracted to one another into tight sealing relationship when said second electromagnetic means is energized in said one direction of current flow and said members are moved apart by repelling magnetic forces in the reverse direction of current flow through said second electromagnetic means.

5. The combination according to claim 4 wherein at least one of said electromagnetic means is an elongated member of magnetizable material provided interiorly thereof with a cavity, and electrical conductors operatively associated with said elongated member and extending longitudinally thereof in said cavity.

6. The combination according to claim 5 wherein said elongated member extends along an edge portion of said damper blade.

7. The combination with a passageway of a damper assembly for controlling flow through said passageway, said damper assembly including:

a damper frame defining an opening, a damper blade adapted to close said opening and mounted for pivotal movement between open and closed positions relative to said passageway, first elongated electromagnetic means for said frame and second elongated electromagnetic means for said blade, each being energizable by electrical current to create a magnetic field with opposite magnetic poles extending longitudinally of each of them in side-by-side relationship, the respective poles of said first and second electromagnetic means being positionally associated in the closed position of said blade and being of opposite polarity in one direction of current flow through said second electromagnetic means, and means for reversing the direction of current flow through said second electromagnetic means in order to reverse the polarity of its magnetic poles and thereby positionally associate respective like poles of said electromagnetic means, the construction and arrangement being such that said frame and said blade are magnetically attracted to one another into tight sealing relationship when said second electromagnetic means is energized in said one direction of current flow and said damper frame and said damper blade are moved apart by repelling magnetic forces in the reverse direction of current flow through said second electromagnetic means.

References Cited
UNITED STATES PATENTS

| | | | |
|---|---|---|---|
| 2,663,998 | 12/1953 | Nolcken | 251—65 X |
| 2,946,554 | 7/1960 | Asker | 251—306 |
| 3,120,943 | 2/1964 | Donelan | 251—139 |
| 3,206,120 | 9/1965 | Bennett | 251—65 |

CLARENCE R. GORDON, *Primary Examiner.*